US011973926B2

(12) United States Patent
Perreault et al.

(10) Patent No.: US 11,973,926 B2
(45) Date of Patent: Apr. 30, 2024

(54) MULTIVIEW AUTOSTEREOSCOPIC DISPLAY USING LENTICULAR-BASED STEERABLE BACKLIGHTING

(71) Applicant: GOOGLE LLC, Mountain View, CA (US)

(72) Inventors: John D. Perreault, Mountain View, CA (US); Andrew Huibers, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/767,372

(22) PCT Filed: Mar. 2, 2021

(86) PCT No.: PCT/US2021/020451
§ 371 (c)(1),
(2) Date: Apr. 7, 2022

(87) PCT Pub. No.: WO2021/178397
PCT Pub. Date: Sep. 10, 2021

(65) Prior Publication Data
US 2022/0400245 A1    Dec. 15, 2022

Related U.S. Application Data

(60) Provisional application No. 62/984,537, filed on Mar. 3, 2020.

(51) Int. Cl.
*H04N 13/32*    (2018.01)
*H04N 13/305*    (2018.01)
(Continued)

(52) U.S. Cl.
CPC ........... *H04N 13/32* (2018.05); *H04N 13/305* (2018.05); *H04N 13/368* (2018.05); *H04N 13/383* (2018.05)

(58) Field of Classification Search
CPC ..................................................... G02B 30/27
(Continued)

(56) References Cited

U.S. PATENT DOCUMENTS 4,959,641 A *  9/1990  Bass .................... H04N 13/305
                                                    348/E13.043
2005/0111100 A1*  5/2005  Mather ................ H04N 13/359
                                                    359/464
(Continued)

FOREIGN PATENT DOCUMENTS

EP          0597629 A1 * 11/1993    ............. H04N 13/04
EP          0597629 A1    5/1994
(Continued)

OTHER PUBLICATIONS

International Preliminary Report on Patentability dated Sep. 15, 2022 for International Application No. PCT/US2021/020451, 7 pages.
(Continued)

*Primary Examiner* — Behrooz M Senfi (57) ABSTRACT

An autostereoscopic display system includes a transmissive display panel including a backlight having an array of backlight pixels, a selectively-selectively-transmissive display pixel matrix having a first side facing the backlight and an opposing second side, the selectively-transmissive display pixel matrix comprising an array of display pixels, a first lenticular array disposed between the backlight and the first side of the selectively-transmissive display pixel matrix, and a second lenticular array disposed facing the second side of the selectively-transmissive display pixel matrix. The backlight is configured to separately activate different subsets of the backlight pixels such that light emitted from an activated subset of backlight pixels and transmitted through the first lenticular array, the selectively-transmissive display pixel matrix, and the second lenticular array is emitted by (Continued)

the display panel as display light in a corresponding separate direction relative to the display panel.

19 Claims, 4 Drawing Sheets

(51) Int. Cl.
  *H04N 13/368* (2018.01)
  *H04N 13/383* (2018.01)
(58) Field of Classification Search
  USPC .......................................................... 348/59
  See application file for complete search history.

(56) References Cited

U.S. PATENT DOCUMENTS

| | | | |
|---|---|---|---|
| 2011/0228059 A1 | 9/2011 | Nagai | |
| 2013/0307948 A1* | 11/2013 | Odake | H04N 13/305 348/59 |
| 2014/0092224 A1 | 4/2014 | Kaseno et al. | |
| 2017/0085869 A1* | 3/2017 | Choi | G02B 30/27 |

FOREIGN PATENT DOCUMENTS

| | | | | | |
|---|---|---|---|---|---|
| GB | 2405519 A | * | 3/2005 | ........... | G02F 1/1323 |
| JP | 2010113160 A | | 5/2010 | | |
| JP | 2019213127 A | * | 12/2019 | ........... | H04N 13/366 |
| WO | WO-2006089542 A1 | * | 8/2006 | ............. | G02B 27/01 |
| WO | 2007069122 A1 | | 6/2007 | | |
| WO | WO-2008049912 A1 | * | 5/2008 | ........... | G02B 26/005 |
| WO | WO-2010052304 A1 | * | 5/2010 | ........... | G02B 27/225 |
| WO | 2017114839 A1 | | 7/2017 | | |
| WO | 2018039586 A1 | | 3/2018 | | |
| WO | WO-2021119807 A1 | * | 6/2021 | ........... | H04N 13/305 |

OTHER PUBLICATIONS

International Search Report and Written Opinion dated Sep. 10, 2021 for International Application No. PCT/US2021/020451, 12 pages.
Translation of Japanese Office Action dated Sep. 5, 2023 for JP Application No. 2022540586, 5 pages.
European Office Action dated Sep. 7, 2023 for EP Application No. 21714063.1, 5 pages.
Yamamoto, et al., "Reduction of the thickness of lenticular stereoscopic display using full color LED panel", Proceedings of the SPIE, vol. 4660, May 2002, p. 236-245.
Translation of Korean Office Action mailed Dec. 7, 2023 for KR Application No. 1020227011470, 43 pages.
Translation of Chinese Office Action dated Feb. 21, 2024 for CN Application No. 202180005630.6, 20 pages.
Japanese Office Action dated Mar. 5, 2024 for JP Application No. 2022540586, 5 pages.

* cited by examiner

MULTIVIEW AUTOSTEREOSCOPIC DISPLAY USING LENTICULAR-BASED STEERABLE BACKLIGHTING

CROSS-REFERENCE TO RELATED APPLICATIONS

The present application is a U.S. National Stage under 35 U.S.C. § 371 of International Patent Application Serial No. PCT/US2021/020451, entitled "MULTIVIEW AUTOSTEREOSCOPIC DISPLAY USING LENTICULAR-BASED STEERABLE BACKLIGHTING" and filed on Mar. 2, 2021, which claims priority to U.S. Provisional Application No. 62/984,537, entitled "MULTIVIEW AUTOSTEREOSCOPIC DISPLAY USING LENTICULAR-BASED STEERABLE BACKLIGHTING" and filed on Mar. 3, 2020, the entireties of which are incorporated by reference herein.

BACKGROUND

Autostereoscopic displays provide a viewer with a sense of binocular perception of three-dimensional (3D) depth by displaying separate stereoscopic images for the viewer's left eye and right eye without requiring the use of separate headgear. One typical autostereoscopic configuration involves the use of a lenticular film overlying the display pixel array and the concurrent display of a stereoscopic pair of images that are interleaved, which results in the lenticular film directing the display light for the pixels of the left-eye image and the display light for the pixels of the right-eye image in slightly different directions, and thereby presenting separate exit pupils for each image of the stereoscopic pair.

In many conventional lenticular-based autostereoscopic display systems, the lenticular film overlay results in a number of concurrent "views"—that is, repeats the same pairing of exit pupils for the stereoscopic pair of images at different angles, or positions, relative to the display surface of the display panel. Some systems leverage these multiple view numbers to provide the same 3D images to different viewers concurrently. However, while a higher lenticular lens resolution for a given pixel resolution results in a higher 3D image resolution perceived by the viewer, it also results in a lower view number, and thus resulting in coverage of fewer viewer positions. Conversely, a lower lenticular lens resolution for a given pixel resolution results a higher view number, and thus the ability to cover more viewer positions, but at the cost of a lower-resolution 3D image being presented to a given viewer. Moreover, such systems are unable to provide different video streams to different viewers concurrently.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Conventional lenticular autostereoscopic displays exhibit tradeoffs between the number of viewer positions supported and the pixel resolution of 3D imagery displayed. In contrast, embodiments of an autostereoscopic display system described herein maintain a high pixel resolution while supporting multiple viewers in multiple possible positions and with a separate video presentation for each viewer through the use of another lenticular array disposed between the backlight and the transmissive display pixel matrix of a display panel in addition to the typical lenticular array overlying the selectively transmissive display pixel matrix. Through selective activation of a subset of backlight pixels of the backlight and this additional lenticular array (referred to herein as the "backlight lenticular array"), the backlighting emitted by the subset of backlight pixels can be transmitted, or "steered", at an intended angle or direction relative to the selectively-transmissive display pixel matrix. Accordingly, the display light resulting by the transmission of the directional backlight emission through the selectively-transmissive display pixel matrix is likewise transmitted through the lenticular array overlying the selectively-transmissive display pixel matrix (referred to herein as the "display lenticular array") at a corresponding angle relative to the surface, or plane, of the transmissive panel matrix. As such, a two-dimensional (2D) frame or composite 3D frame (that is, a frame formed from the interleaving of pixels from a left-eye image and pixels of a right-eye image of a stereoscopic image pair) can be "steered" toward an expected viewer position through activation of the subset of backlight pixels associated with that expected viewer position. In this manner, multiple viewers can be supported by successively steering different frames for different viewers to their respective expected viewer positions. With this configuration, the display panel does not exhibit repeat view zones, and thus a higher display resolution can be maintained for any given viewer while also supporting a wide variety of viewer positions. Further, in some embodiments, the autostereoscopic display system employs head/eye pose tracking so as to track the poses of one or multiple viewers, and thus estimate or determine the expected viewer position, and, more specifically, the viewer's eye positions in some implementations, thereby facilitating accurate steering of the displayed image for that viewer.

Figure 1:
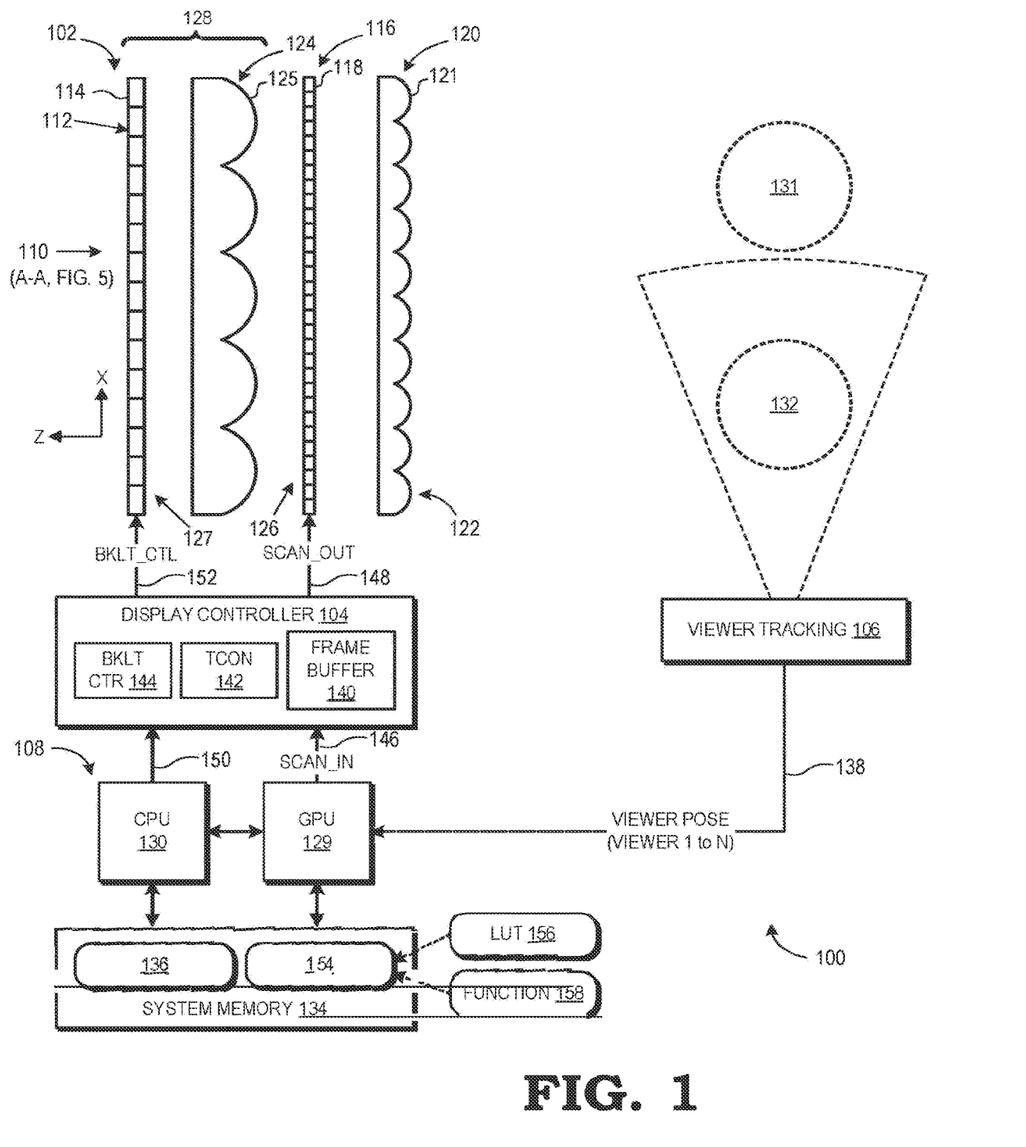
FIG. 1 is a diagram illustrating a simplified cross-section of an autostereoscopic display panel and a block diagram of other components of the autostereoscopic display system in accordance with some embodiments.

FIG. 1 illustrates an autostereoscopic display system 100 employing a lenticular-based steerable backlight to support multiple concurrent viewers in accordance with at least one embodiment. The display system 100 comprises any of a variety of electronic systems utilized to display video or other imagery, including computer monitors, video gaming devices, televisions, tablet computers, laptop computers, and other panel displays. The display system 100 includes a display panel 102, a display controller 104, a viewer tracking subsystem 106, and a video subsystem 108. Although illustrated as separate from the display panel 102 for ease of reference, in some embodiments one or more of the display controller 104, viewer tracking subsystem 106, and video subsystem 108 may be integrated as part of the display panel 102.

As shown by cross-section view 110 (corresponding to cut A-A along the X-Z plane shown in FIG. 5), the display panel 102 is a transmissive-type display panel that includes a backlight 112 composed of a matrix or other two-dimensional array of backlight pixels 114 (e.g., white-light LEDs) and a selectively-transmissive display pixel matrix 116 similarly composed of a matrix or other two-dimensional array of transmissive display pixels 118 (e.g., composed of red, green, and blue (RGB) sub-pixel LEDs). The transmissive display pixels 118 can include any of a variety of display pixels configured to selectively filter or block incident backlight from the backlight 112 based on a corresponding pixel value in order to configure the resulting transmitted light to affect a particular color and intensity. Examples of such transmissive display pixels include active-matrix or passive-matrix liquid crystals (LCs), such as thin-film-transistor (TFT) LCs. Typically, the display pixel matrix 116 has a higher resolution (that is, greater number of pixels) than the backlight 112, but in some embodiments the resolution of the backlight 112 may meet or exceed the resolution of the display pixel matrix 116. The display panel 102 further includes a display lenticular array 120 overlying or otherwise disposed adjacent to a viewer-facing side 122 of the display pixel matrix 116. The display lenticular array 120, in one embodiment, is composed of an array or other matrix of magnifying lenses 121, known as "lenticules", that when viewed from different angles magnify different regions of an underlying base. Accordingly, as is known in the art and as described in greater detail below, the overlay of the display lenticular array 120 and the display pixel matrix 116, when used in conjunction with display of a composite 3D frame composed of an interleaved (e.g., by column) stereoscopic pair of images, presents a full-parallax binocular stereoscopic display content to a viewer.

Further, to facilitate provision of 3D image content in specified directions relative to the face of the display panel 102 (which in turn facilitates supporting multiple concurrent viewers), in at least one embodiment the display panel 102 further includes a backlight lenticular array 124 disposed between, and substantially parallel to, a back-facing side 126 of the display pixel matrix 116 and a front-facing side 127 of the backlight 112. As with the display lenticular array 120, the backlight lenticular array 124 is composed of an array or other matrix of lenticules 125. For ease of illustration, both the display lenticular array 120 and the backlight lenticular array 124 each is composed of a plastic or glass sheet of columnar lenticules (that is, magnifying lenses extending in vertical columns relative to the customary orientation of display panels), with the display lenticular array 120 having a higher pitch than the backlight lenticular array 124.

The physical arrangement of the backlight 112, backlight lenticular array 124, selectively-transmissive display pixel matrix 116, and display lenticular array 120 as shown in cross-section view 110 has the effect that backlight emitted by a particular backlight pixel 114 is directed by the backlight lenticular array 124 through the selectively-transmissive display pixel matrix 116 and then through the display lenticular array 120 in a particular direction. As such, "display light" resulting from the modification of emitted backlight as it traverses the selectively-transmissive display pixel matrix 116 is emitted by the display panel 102 in a particular direction (relative to the display surface of the display panel 102) that is based on the particular location of the backlight pixel 114 that emitted the backlight. Accordingly, as described in greater detail herein, the backlight 112 is configured to permit different subsets of backlight pixels 114 to be activated separately, and through the activation of a particular subset of backlight pixels 114, the resulting display light emitted by the display panel 102 can be controlled to be emitted in a corresponding direction. In this manner, the backlight 112 and backlight lenticular array 124 together operate as a "steerable" backlight 128 that is operable to steer display light representative of the visual content of a frame being displayed in a particular direction. As such, the display panel 102 can be controlled to "steer" different successive displayed images to different viewer locations, and thus allow 3D content to be viewed by multiple viewers concurrently without requiring the viewers to wear special headgear.

To this end, the display system 100 utilizes the viewer tracking subsystem 106 to track the pose of each of one or more viewers, such as the two viewers 131, 132 illustrated in FIG. 1. The viewer tracking subsystem 106 includes any of a variety of systems employed for head and/or eye pose tracking as known in the art. For example, the viewer tracking subsystem 106 can include a stereoscopic camera subsystem that utilizes reflected infrared (IR) light or other structured light to detect the presence of a viewer's face and further to detect the position and orientation (that is, the "pose") of the viewer's eyes relative to the display panel 102. For ease of reference, the systems and techniques of the present disclosure generally are described in the context of eye pose tracking, but these descriptions apply equally to head tracking more generally, and thus reference to a viewer's pose refers to any of a relative position of one or both eyes of a viewer, an orientation of one or both eyes of a viewer, a relative position of a head of a viewer, an orientation of the head of a viewer, or combinations thereof, unless otherwise noted. Further, for purposes of the following, the viewer's pose is described herein with reference to the display surface of the display panel 102 (that is, an X-Y plane defined by the display panel 102) at a point at, for example, the center of the display panel 102. However, in other embodiments, the pose may be defined relative to a different fixed reference, such as a center point between two cameras of the tracking subsystem 106, a specified corner of the display panel 102, and the like.

The video subsystem 108, in one embodiment, includes one or more processors, such as at least one central processing unit (CPU) 130 and at least one graphics processing unit (GPU) 129, at least one system memory 134, and various input/output (I/O) devices, mass storage devices, and the like (not illustrated). The system memory 134 stores one or more software programs executed by one or both of the CPU 130 and GPU 129, such as a video generation software application 136 that includes executable instructions that manipulate the CPU 130 and GPU 129 to generate sequences of image frames (hereinafter, simply "frames") for one or more viewers. The video generation software application 136 can include, for example, a rendering-based application that renders frames composed primarily of computer graphics, such as a video game application, a decoding-based application that generates frames by decoding previously-encoded frames (such as a television streaming application), or a combination thereof (such as an augmented reality application renders an AR overlay for a decoded real-world video stream).

In at least one embodiment, the generated frames are 3D composite frames composed of a left-eye image interlaced with a right-eye image, the left-eye image and right-eye image together forming a stereoscopic image pair that when viewed by the respective left eye and right eye of a viewer provides the viewer with binocular, or stereoscopic, perception of depth (that is, perception of a "3D" image). Further, in some embodiments, the video subsystem 108 generates separate streams for each viewer tracked by the viewer tracking subsystem 106. Thus, for the two viewers 131, 132 in the example of FIG. 1, the video subsystem 108 generates one stream of composite frames for viewer 131 and another stream of composite frames for viewer 132. As described in greater detail below, the GPU 129 utilizes current viewer pose information 138 for a given viewer as determined and provided by the viewer tracking subsystem 106 to generate the corresponding video stream to reflect that viewer's current pose in the visual content represented in the frames of the video stream. For example, the visual content represented in the frames can be rendered so as to correspond to the perspective of the viewer relative to the display panel 102 as based on the viewer's current pose.

In the illustrated embodiment, the display controller 104 includes a frame buffer 140, a timing controller (TCON) 142, and a backlight controller 144. The display controller 104 is implemented as, for example, a display driver integrated circuit (DDIC) that can be part of the display panel 102 itself, as part of the video subsystem 108, or a component disposed between the two. The frame buffer 140 is implemented as, for example, graphics random access memory (GRAM) or, in some embodiments, part of the system memory 134, and operates to temporarily buffer the pixel data of frames generated by the video subsystem 108 and transferred from the GPU 129 via a SCAN_IN signal 146. The timing controller 142 is coupled to the frame buffer 140 and includes clock sources and programmable or fixed logic operable to transfer the pixel data stored for a frame in the frame buffer 140 to the display pixel matrix 116 typically on a line-by-line basis using a SCAN_OUT signal 148 as well as various other timing and control signals (not illustrated) using any of a variety of techniques or protocols as known in the art.

The backlight controller 144 (denoted "BLK_CTR" in FIG. 1) is coupled to the timing controller 142 and has an input to receive backlight configuration information 150 from the CPU 130 or other component of the video subsystem 108, and based on the backlight configuration information 150 generate a backlight control (BKLT_CTL) signal 152 that selectively activates a corresponding subset of backlight pixels 114 of the backlight 112, and thereby "steering" the resulting display light emitted by the display panel 102 in a corresponding direction. In at least one embodiment, the system memory 134 includes a viewer steering application 154 that includes executable code that manipulates the CPU 130 to identify, for a selected viewer, the viewer's current pose from the viewer pose information 138 provided by the viewer tracking subsystem 106, determine a direction of that viewer relative to the display panel 102 based on the viewer's current pose, and then provide a representation of the determined direction to the backlight controller 144 as the backlight configuration information 150. Then, as noted above, the backlight controller 144 activates a corresponding subset of backlight pixels 114 so that the emitted backlight is steered through the selectively-transmissive display pixel matrix 116 by the backlight lenticular array 124 in a direction that intercepts the viewer's current position, and thus presenting the visual content of the frame currently displayed at the selectively-transmissive display pixel matrix 116 in the emitted display light.

Figure 2:
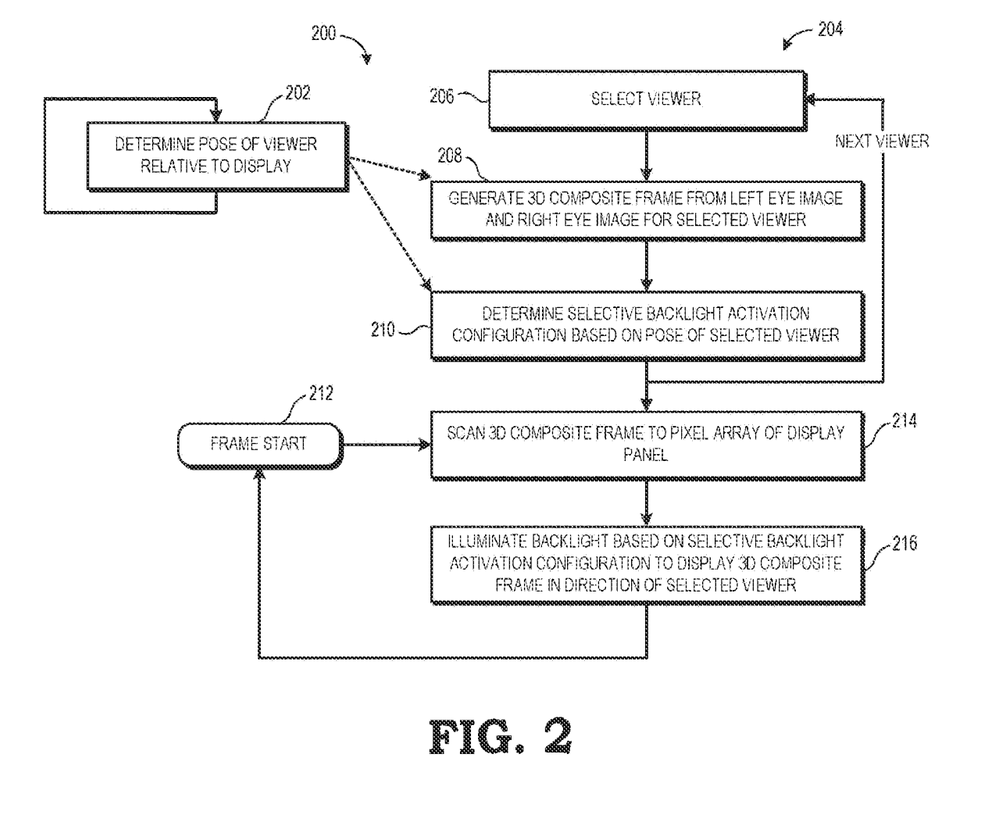
FIG. 2 is a flow diagram illustrating a method for providing 3D image display to multiple viewers using the autostereoscopic display system having a steerable backlight in accordance with some embodiments.
Figure 3:
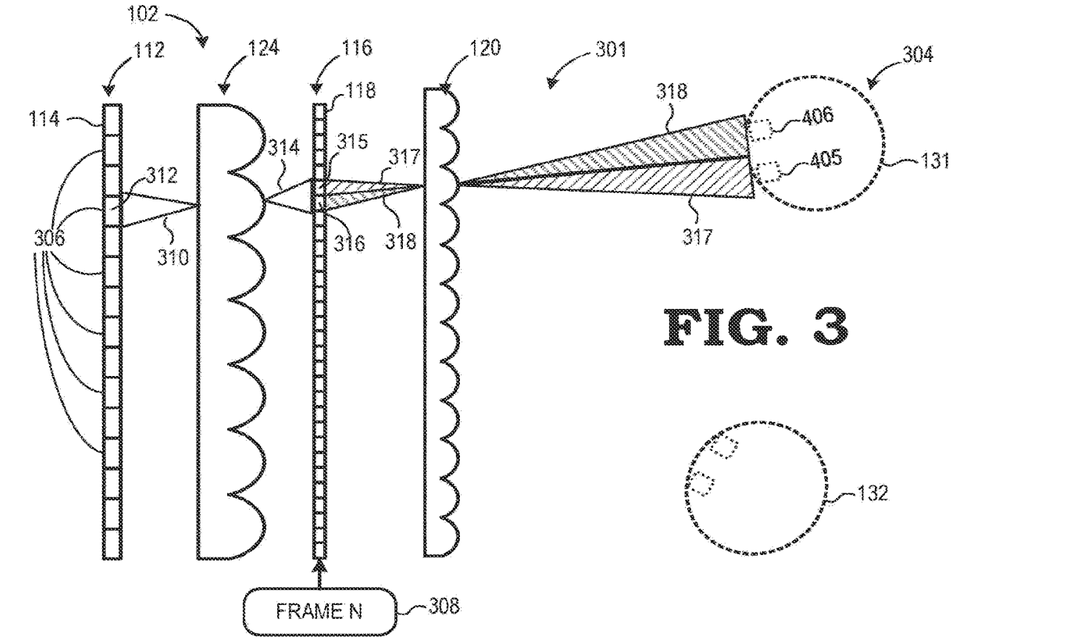
FIG. 3 is a diagram showing a plan view of an example operation of an autostereoscopic display system in accordance with the method of FIG. 2.
Figure 4:
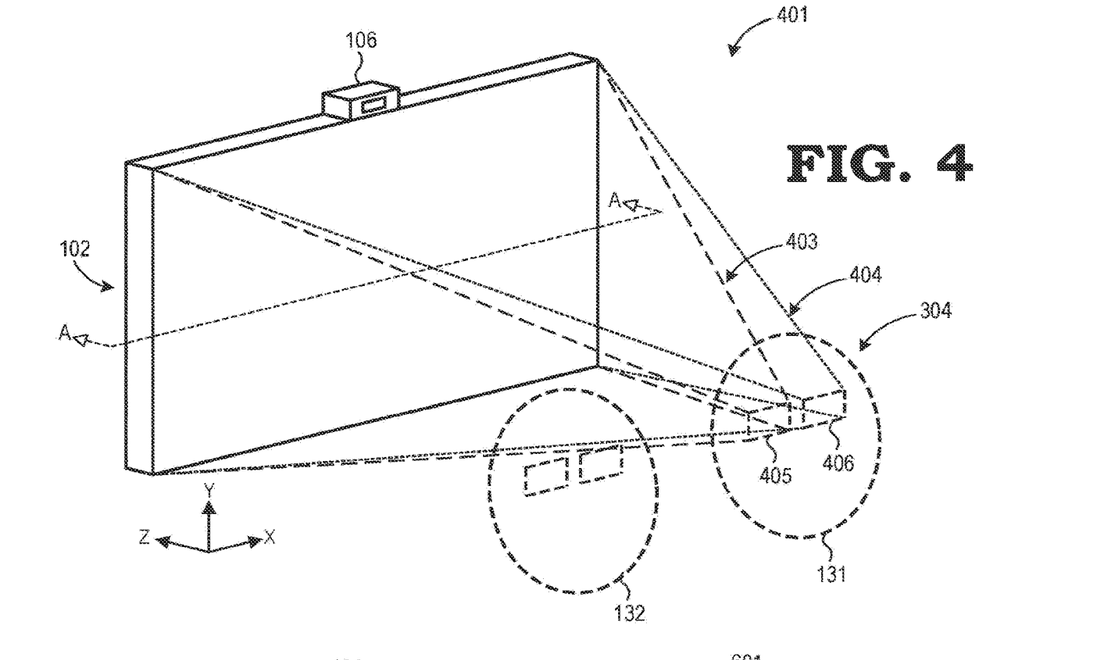
FIG. 4 is a diagram illustrating a perspective view of the example operation of FIG. 3 in accordance with some embodiments.

FIG. 2 depicts a method 200 that illustrates the multi-viewer operation of the display system 100 of FIG. 1 in greater detail. For purposes of illustration, the method 200 is described below with reference to FIGS. 3 and 4, with FIG. 3 illustrating an example plan view of a two-viewer operation of method 200, and FIG. 4 illustrating a corresponding perspective view of this same two-viewer operation. However, while a particular example with two viewers is illustrated, it will be appreciated that the described technique can be extended to any number of viewers using the guidelines provided herein.

As illustrated, the method 200 includes two subprocesses: a viewer tracking subprocess 202 and a viewer display subprocess 204. In the viewer tracking subprocess 202, the viewer tracking subsystem 106 uses any of a variety of well-known or proprietary techniques to identify the presence of each viewer present within a certain range of the display surface of the display panel 102, and for each identified viewer monitors the current viewer pose for that viewer. To illustrate, the viewer tracking subsystem 106 can use any of a variety of face detection algorithms to detect the presence of a viewer's face, and then utilize any of a variety of pose detection algorithms to detect the location and orientation of the detected face, or in some instances, the eyes of the detected face, and repeatedly update this information. Such techniques can utilize stereoscopic image capture and analysis, depth sensing using IR light or structured light projection, and the like. The current viewer pose for each detected viewer, such as viewers 131 and 132 of FIG. 1, is then periodically transmitted to the video subsystem 108 as viewer pose information 138, as described above.

In the method 200, the viewer display subprocess 204 represents the process of displaying a composite frame to a particular viewer through steering of the display light generated by the display panel 102 via the lenticular-based steerable backlight 128 such that the display light is projected from the display panel 102 in a direction that intercepts the current pose of the corresponding viewer. Accordingly, as an initial step, at block 206 a viewer is selected from the one or more viewers identified at the current iteration of subprocess 202. This selection can include, for example, a round-robin selection, or may be based on some form of prioritization, such as selecting viewers closer to the display panel 102 at a higher ratio than viewers further from the display panel 102.

At block 208, execution of the video generation software application 136 at the video subsystem 108 manipulates the GPU 129 to generate a 3D composite frame and buffer the composite frame in the frame buffer 140. The composite frame, as noted above, is a combined stereoscopic pair of images—that is, contains both a left-eye image and a right-eye image that, when viewed by their respective eyes of the viewer, present a binocular sense of depth for the displayed imagery. This combination typically is implemented in an alternating column approach, such that, for example, the even columns of the composite frame contain the columns of the left-eye image while the odd columns of the composite frame contain the columns of the right-eye image. As is known in the art, when such a composite frame is viewed through a lenticular array, such as the display lenticular array 120, the particular view angles presented by the lenticules result in separation of the display light emitted from the even columns into display light transmitted to one exit pupil (e.g., the left eye exit pupil) and display light emitted from the odd columns into display light transmitted to another exit pupil (e.g., the right eye exit pupil). In at least one embodiment, the CPU 130 receives the current viewer pose information 138 for the selected viewer and directs the GPU 129 to render the composite frame so as to reflect the current viewer pose using any of a variety of well-known or proprietary 3D rendering techniques, such as those frequently employed to provide a sense of depth for virtual reality (VR) headsets or augmented reality (AR) headsets based on a pose of the user relative to a reference coordinate system for a virtual world or the real world.

At block 210, execution of the viewer steering application 154 manipulates the CPU 130 to identify a selective backlight activation configuration that, in conjunction with the backlight lenticular array 124, will cause emitted backlight to be steered through the selectively-transmissive display pixel matrix 116 in a direction that will intercept the viewer at the current viewer pose detected for that viewer. The viewer steering application 154 then provides a representation of the identified selective backlight activation configuration as backlight configuration information 150 for the upcoming frame period. This selective backlight activation configuration represents a corresponding subset of backlight pixels 114 that, when activated, emit backlight that is then collimated and refracted by lenticules of the backlight lenticular array 124 at a corresponding angle relative to the plane of the selectively-transmissive display pixel matrix 116, and thus result in transmission of the resulting display light in the intended direction to intercept the viewer.

The particular subset of backlight pixels 114 that result in display light being transmitted in a corresponding direction is a function of the physical arrangement of the backlight pixels 114 in the backlight 112, the pitch, configuration, and arrangement of the lenticules 125 in the backlight lenticular array 124, and the distance between the backlight 112 and the backlight lenticular array 124, among others. The subset typically is a subset of columns of the backlight pixels 114 that forms a bar-pattern of black, or dark, (inactivated) and white, or bright, (activated) stripes of columns, where the period, duty cycle, and phase of the bar-pattern is configured based on the pose of the corresponding viewer. Other patterns and configurations of the subset can be implemented depending on the configuration of the display panel 102 and its corresponding lenticular and display pixel components.

The correspondence between subsets of backlight pixels 114 and corresponding display light projection directions can be determined in any of a variety of ways. In some embodiments, the components of the display panel 102 are modeled or simulated and the correspondences between subset and display direction determined through this modeling/simulation. In other embodiments, a test system having the same configuration is constructed, and then different subsets of backlight pixels 114 are activated and their corresponding "steered" display directions are detected using a photometer or other testing tool. The resulting determined correspondences then can be represented for subsequent reference and determination by the viewer steering application 154 using any of a variety of techniques. For example, in some embodiments, the correspondences between activation of different subsets of backlight pixels 114 and the resulting display light projection directions is represented in a look up table (LUT) 156 (FIG. 1), which each entry of the LUT 156 storing an identifier or other representation of a specific subset of backlight pixels 114 and being indexed based on a representation of a corresponding pose (e.g., an angle of the pose relative to the display surface of the display panel 102). Accordingly, the viewer steering application 154 can determine the appropriate representation of a received current viewer's pose, index an entry of the LUT 156 based on this representation, and determine a representation of the corresponding subset of backlight pixels 114 that need to be activated in order to steer the backlight, and thus steer the resulting display light, in a direction that intercepts the current viewer's pose. As another example, the correspondences between viewer poses/steered backlight direction and corresponding subset of backlight pixels 114 activated can be represented using a function representation 158 (FIG. 1).

At the start of the next frame period (represented by block 212), the display controller 104 scans the pixel data of the composite frame generated and buffered at block 208 out to the corresponding display pixels 118 of the selectively-transmissive display pixel matrix 116 via the SCAN_OUT signal 148 (and other timing and control signals, not illustrated) at block 214. At block 216, the backlight controller 144 uses the selective backlight activation configuration identified in the backlight configuration information 150 provided at block 210 to selectively activate the backlight pixels 114 included in the subset identified by the backlight configuration information 150 while maintaining the other backlight pixels 114 in a deactivated state (or in some embodiments, at a very low level of activation compared to the activation level of the pixels of the selected subset). The backlight pixels 114 of the subset, thus activated, emit backlight that is collimated and refracted by the lenticules 125 of the backlight lenticular array in a particular direction relative to the selectively-transmissive display pixel matrix 116. Meanwhile, with the display pixels 118 of the display pixel matrix 116 configured based on the scanned in pixel data for the current composite frame, the steered backlight is transmitted through, and modified by, the selectively-transmissive display pixel matrix 116, resulting in display light that contains the visual content represented by the composite frame. This steered display light in turn is separated by the display lenticular array 120 in to a left-eye image and right-eye image, with the display light corresponding to the left-eye image refracted in a direction corresponding to a left-eye exit pupil that coincides with the expected position of the left eye of the viewer selected at block 204 and with the display light corresponding to the right-eye image refracted in a direction corresponding to a right-eye pupil that coincides with the expected position of the right eye of the selected viewer.

Thus, in one iteration of the viewer display subprocess 204 for a corresponding frame period, a 3D image is generated and displayed in the expected direction of a selected viewer. For the next frame period, a next iteration of the viewer display subprocess 204 is performed for the next selected viewer, resulting in generation of a 3D image and display of that 3D image in the direction of the next selected viewer, and so forth. In this manner, 3D images can be generated and steered to different viewers in an interleaved pattern, resulting in multiple interleaved video streams being presented to multiple viewers concurrently. For example, if the display system 100 has a refresh rate of 120 frames per second (fps) and there are two viewers, then each viewer can be presented a separate video stream at an effective rate of 60 fps. Similarly, if there are three viewers, then a separate 3D video stream can be displayed to each viewer at an effective rate of 40 frames per second. Thus, through the use of a lenticular-based steerable backlight as described herein, multiple viewers each can be presented with a separate 3D video stream at the full resolution of the display panel 102, and with only the frame rate being primarily affected based on the number of viewers being concurrently supported.

Figure 5:
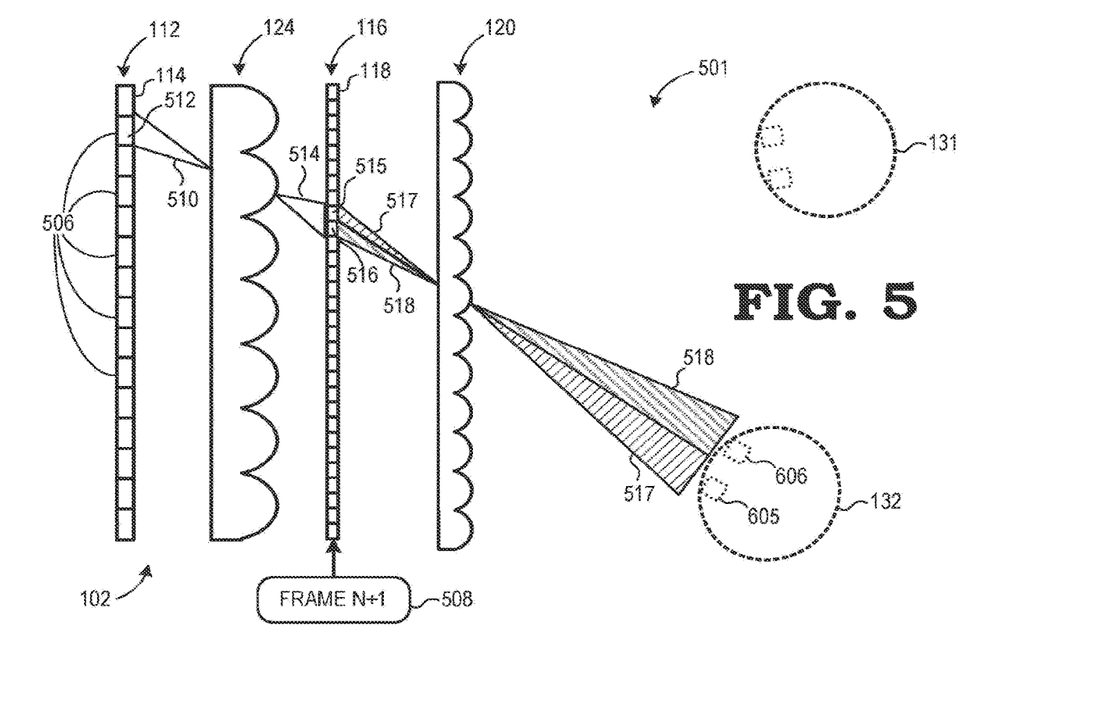
FIG. 5 is a diagram showing a plan view of an example operation of an autostereoscopic display system in accordance with the method of FIG. 2.
Figure 6:
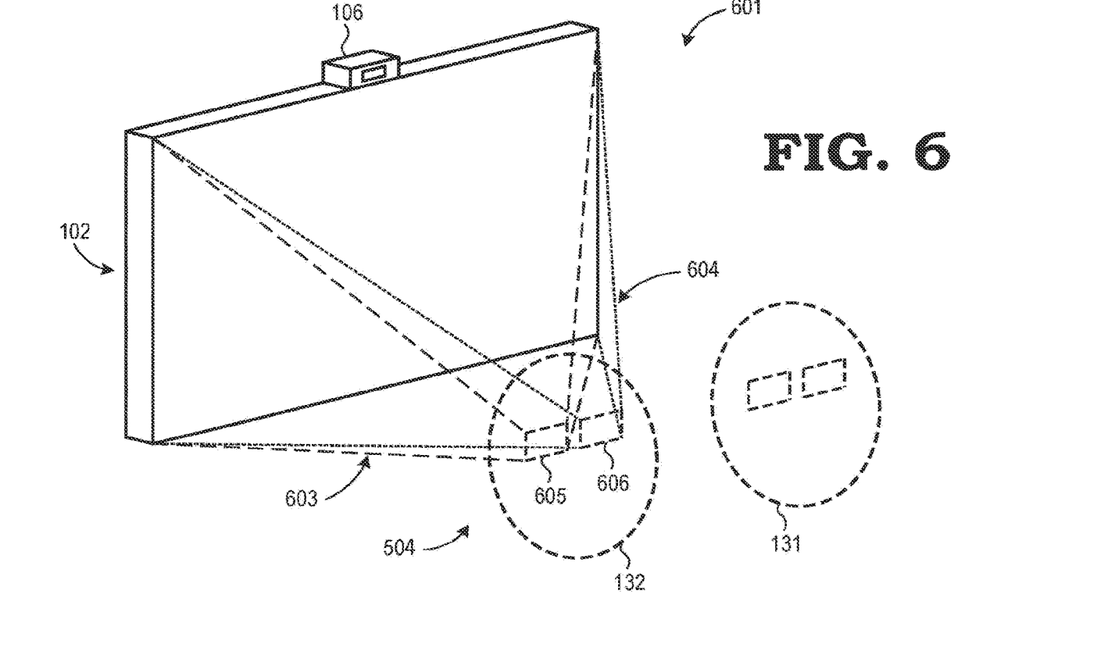
FIG. 6 is a diagram illustrating a perspective view of the example operation of FIG. 5 in accordance with some embodiments.

FIGS. 3-6 together illustrate an example operation of the method 200 in the autostereoscopic display system 100 for a two-viewer configuration. FIG. 3 depicts a plan/cross-section view 301 of the display panel 102 and the two viewers 131, 132 for display of a composite frame N to viewer 131, and FIG. 4 depicts a corresponding perspective view 401 of the display panel 102 and two viewers 131, 132 during display of this composite frame N. FIG. 5 depicts a plan/cross-section view 501 of the display panel 102 and the two viewers 131, 132 for display of a next composite frame N+1 to viewer 132, and FIG. 6 depicts a corresponding perspective view 601 of the display panel 102 and two viewers 131, 132 during display of this composite frame N+1.

Turning to plan view 301 of FIG. 3 and corresponding perspective view 401 of FIG. 4, the viewer 131 is detected by the viewer tracking subsystem 106 to have a current pose 304 for the upcoming display of frame N. Accordingly, the viewer steering application 154 provides a representation of the current pose 304 (e.g., a representation of the position of the viewer 131) as input to the LUT 156 and obtains as output an identifier representing a subset 306 (FIG. 3) of backlight pixels 114 that correspond to the current pose 304, where in this simplified example the subset 306 is composed of the indicated columns of backlight pixels 114 that form a first bar-pattern with a corresponding period, phase, and duty-cycle that results in backlight and, consequently, transmissively-modified display light to be propagated in the direction of the current pose 304 of the viewer 131. Concurrently, pixel data 308 (FIG. 3) representative of the composite frame N is scanned into the selectively-transmissive display pixel matrix 116. Responsive to a vertical blank (VBLANK) signal or other timing signal signaling the start of the frame period for frame N, the backlight controller 144 configures the BKLT_CTL signal 152 to activate the backlight pixels 114 of the subset 306 while maintaining the other backlight pixels 114 of the backlight 112 in an inactivated or low-activation state. So activated, the backlight pixels 114 of the subset 306 emit backlighting, which is collimated and steered by the backlight lenticular array 124 through the selectively-transmissive display pixel matrix 116 and the display lenticular array 120, resulting in display light representing the visual content of composite frame N that is projected from the display panel 102 in a direction that intersects the current pose 304 and thus presents 3D imagery to the viewer 131. In particular, through the use of a composite frame that contains interleaved left-eye and right-eye images, and through the subsequent separation of the display light for each of these two images by the display lenticular array 120, this display light is projected as left-eye display light 403 (FIG. 4) and right-eye display light 404 (FIG. 4) toward a left-eye exit pupil 405 (FIG. 4) and a right-eye exit pupil 406 (FIG. 4), respectively, that coincide with the expected position of the left eye and right eye, respectively, of the viewer 131 while at pose 304.

View 301 of FIG. 3 further illustrates this process by way of a simple example with reference to the backlight from a single row of backlight pixels 114 and two rows of display pixels 118. Activation of the subset 306 results in backlighting 310 emitted by a column 312 of backlight pixels 114. This backlighting 310 is collimated and steered by the backlight lenticular array 124 in a direction that causes the resulting steered backlighting 314 to transmit through adjacent pixel columns 315, 316 of the display pixel matrix 116, resulting in the conversion of the incident backlighting into display light 317 from pixel column 315 and display light 318 from pixel column 316. In this example, pixel column 315 contains pixel data for a corresponding column of the left-eye image of the composite frame N and pixel column 316 contains pixel data for a corresponding column of the right-eye image of the composite frame N, and thus the display light 317 contains visual content intended for perception by the left eye of the viewer 131 and the display light 318 contains visual content intended for perception by the right eye of the viewer 131. The display light 317, 318 is transmitted though the display lenticular array 120, with the display lenticular array 120 steering the display light 317 in a direction that forms the left-eye exit pupil 405 for the left eye of the viewer 131 and steering the display light 318 in a direction that forms the right-eye exit pupil 406 for the right eye of the viewer 131, and thereby presenting the viewer 131 with a stereoscopic 3D image represented by composite frame N.

Turning now to plan view 501 of FIG. 5 and corresponding perspective view 601 of FIG. 6, the viewer 132 is detected by the viewer tracking subsystem 106 to have a current pose 504 for the upcoming display of frame N+1. Accordingly, the viewer steering application 154 provides a representation of the current pose 504 as input to the LUT 156 and obtains as output an identifier representing a subset 506 (FIG. 5) of backlight pixels 114 that correspond to the current pose 504, where in this simplified example the subset 506 is composed of the indicated columns of backlight pixels 114 that form a second bar-pattern with a corresponding period, phase, and duty-cycle that results in backlight and, consequently, transmissively-modified display light to be propagated in the direction of the current pose 504 of the viewer 132. Concurrently, pixel data 508 (FIG. 5) representative of the composite frame N+1 is scanned into the selectively-transmissive display pixel matrix 116. Responsive to a timing signal signaling the start of the frame period for frame N, the backlight controller 144 configures the BKLT_CTL signal 152 to activate the backlight pixels 114 of the subset 506 while maintaining the other backlight pixels 114 of the backlight 112 in an inactivated or low-activation state. So activated, the backlight pixels 114 of the subset 506 emit backlighting, which is collimated and steered by the backlight lenticular array 124 through the selectively-transmissive display pixel matrix 116 and the display lenticular array 120, resulting in display light representing the visual content of composite frame N+1 that is projected from the display panel 102 in a direction that intersects the current pose 504 and thus presents 3D imagery to the viewer 132. In particular, through the use of a composite frame and operation of the display lenticular array 120, this display light is projected as left-eye display light 603 (FIG. 6) and right-eye display light 604 (FIG. 6) toward a left-eye exit pupil 605 (FIG. 6) and a right-eye exit pupil 606 (FIG. 6), respectively, that coincide with the expected position of the left eye and right eye, respectively, of the viewer 132 while at pose 504.

View 501 of FIG. 5 further illustrates this process by way of a simple example with reference to the backlight from a single row of backlight pixels 114 and two rows of display pixels 118. Activation of the subset 506 results in backlighting 510 emitted by a column 512 of backlight pixels 114. This backlighting 510 is collimated and steered by the backlight lenticular array 124 in a direction that causes the resulting steered backlighting 514 to transmit through adjacent pixel columns 515, 516 of the display pixel matrix 116, resulting in the conversion of the incident backlighting into display light 517 from pixel column 515 and display light 518 from pixel column 516. In this example, pixel column 515 contains pixel data for a corresponding column of the left-eye image of the composite frame N+1 and pixel column 516 contains pixel data for a corresponding column of the right-eye image of the composite frame N+1, and thus the display light 517 contains visual content intended for perception by the left eye of the viewer 132 and the display light 518 contains visual content intended for perception by the right eye of the viewer 132. The display light 517, 518 is transmitted though the display lenticular array 120, with the display lenticular array 120 steering the display light 517 in a direction that forms the left-eye exit pupil 605 for the left eye of the viewer 132 and steering the display light 518 in a direction that forms the right-eye exit pupil 606 for the right eye of the viewer 132, and thereby presenting the viewer 132 with a stereoscopic 3D image represented by composite frame N+1.

The process illustrated by FIGS. 3-6 can be iteratively performed by interleaving composite frames intended for viewer 131 with composite frames intended for viewer 132, with viewer 131 being presented with a video stream implemented via the presentation of composite frames N+i (i=0, 2, 4, 6, 8, . . . ) steered to the most recently detected pose of the viewer 131 via the lenticular backlight steering process described above, while viewer 132 is presented with a video stream implemented via the presentation of composite frames N+k (k=1, 3, 5, 7, 9, . . . ) steered to the more recently detected pose of the viewer 132 via this same lenticular backlight steering process.

In accordance with one aspect, an autostereoscopic display system includes a transmissive display panel comprising a backlight having an array of backlight pixels; a selectively-selectively-transmissive display pixel matrix having a first side facing the backlight and an opposing second side, the selectively-transmissive display pixel matrix comprising an array of display pixels; a first lenticular array disposed between the backlight and the first side of the selectively-transmissive display pixel matrix; and a second lenticular array disposed facing the second side of the selectively-transmissive display pixel matrix. The backlight is configured to separately activate different subsets of the backlight pixels such that light emitted from an activated subset of backlight pixels and transmitted through the first lenticular array, the selectively-transmissive display pixel matrix, and the second lenticular array is emitted by the display panel as display light in a corresponding separate direction relative to the display panel.

According to further embodiments, the autostereoscopic display system may comprise one or more (e.g., all) of the following features (or any combination thereof). In some embodiments, the system further includes a display controller coupled to the backlight and the selectively-transmissive display pixel matrix, the display controller configured to: display a first frame and a second frame in sequence, the first frame associated with a first video stream and the second frame associated with a second video stream; activate a first subset of backlight pixels of the backlight for display of the first frame such that light emitted from the first subset of backlight pixels during display of the first frame and transmitted through the first lenticular array, the selectively-transmissive display pixel matrix, and the second lenticular array is emitted by the display panel as first display light in a first direction relative to the display panel, the first display light representative of image content of the first frame; and activate a second subset of backlight pixels of the backlight for display of the second frame such that light emitted from the second subset of backlight pixels during display of the second frame and transmitted through the first lenticular array, the selectively-transmissive display pixel matrix, and the second lenticular array is emitted by the display panel as display light in a second direction relative to the display panel, the second display light representative of image content of the second frame, the second subset different from the first subset, and the second direction different from the first direction. The system further can include a viewer tracking subsystem configured to track a pose of each of one or more viewers, wherein the first subset of backlight pixels is selected based on a pose of a first viewer such that the first direction intersects with the pose of the first viewer relative to the display panel, and wherein the second subset of backlight pixels is selected based on a pose of a second viewer such that the second direction intersects with the pose of the second viewer relative to the display panel. In some embodiments, the system further includes a video subsystem configured to generate the first frame based on the pose of the first viewer and to generate the second frame based on the pose of the second viewer. Each of the first frame and the second frame can include a three-dimensional (3D) composite frame comprising a first subset of pixels representing image content for a left eye of a viewer and a second subset of pixels representing image content for a right eye of the viewer. The pose of a viewer includes at least one of a: pose of a head of the viewer; and a pose of at least one eye of the viewer. In some embodiments, activation of the first subset of backlight pixels produces a first bar-pattern of backlighting; and activation of the second subset of backlight pixels produces a second bar-pattern of backlighting. In some embodiments, the system further includes a video subsystem configured to generate the frame for display based on the pose of a viewer intended to view the display of the frame.

Another aspect includes a method to operate the autostereoscopic display system. Still further, one aspect includes a non-transitory computer readable medium storing executable instructions configured to manipulate at least one processor to perform the method.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An autostereoscopic display system comprising:
   a transmissive display panel comprising:
      a backlight having an array of backlight pixels;
      a selectively-transmissive display pixel matrix having a first side facing the backlight and an opposing second side, the selectively-transmissive display pixel matrix comprising an array of display pixels;
      a first lenticular array disposed between and directly adjacent to the backlight and the first side of the selectively-transmissive display pixel matrix;
      a second lenticular array disposed directly adjacent to and facing the opposing second side of the selectively-transmissive display pixel matrix; and
      wherein the backlight is configured to separately activate different subsets of the backlight pixels corresponding to at least one detected pose of one or more viewers such that light emitted by an activated subset of backlight pixels and transmitted through the first lenticular array, the selectively-transmissive display pixel matrix, and the second lenticular array is emitted by the transmissive display panel as display light in a corresponding separate direction relative to the transmissive display panel.

2. The autostereoscopic display system of claim 1, further comprising:
   a display controller coupled to the backlight and the selectively-transmissive display pixel matrix, the display controller configured to:
      display a first frame and a second frame in sequence, the first frame associated with a first video stream and the second frame associated with a second video stream;
      activate a first subset of backlight pixels of the backlight for display of the first frame such that light emitted from the first subset of backlight pixels during display of the first frame and transmitted through the first lenticular array, the selectively-transmissive display pixel matrix, and the second lenticular array is emitted by the transmissive display panel as first display light in a first direction relative to the transmissive display panel, the first display light representative of image content of the first frame; and
      activate a second subset of backlight pixels of the backlight for display of the second frame such that light emitted from the second subset of backlight pixels during display of the second frame and transmitted through the first lenticular array, the selectively-transmissive display pixel matrix, and the second lenticular array is emitted by the transmissive display panel as display light in a second direction relative to the transmissive display panel, the second display light representative of image content of the second frame, the second subset different from the first subset, and the second direction different from the first direction.

3. The autostereoscopic display system of claim 2, further comprising:
   a viewer tracking subsystem configured to track a pose of each of the one or more viewers;
   wherein the first subset of backlight pixels is selected based on a pose of a first viewer such that the first direction intersects with the pose of the first viewer relative to the transmissive display panel; and
   wherein the second subset of backlight pixels is selected based on a pose of a second viewer such that the second direction intersects with the pose of the second viewer relative to the transmissive display panel.

4. The autostereoscopic display system of claim 3, further comprising:
   a video subsystem configured to generate the first frame based on the pose of the first viewer and to generate the second frame based on the pose of the second viewer.

5. The autostereoscopic display system of claim 2, wherein:
   each of the first frame and the second frame comprises a three-dimensional (3D) composite frame comprising a first subset of pixels representing image content for a left eye of a viewer of the one or more viewers and a second subset of pixels representing image content for a right eye of the viewer.

6. The autostereoscopic display system of claim 4, wherein the pose of a viewer includes at least one of a pose of a head of the viewer or a pose of at least one eye of the viewer.

7. The autostereoscopic display system of claim 2, wherein:
   activation of the first subset of backlight pixels produces a first bar-pattern of backlighting; and activation of the second subset of backlight pixels produces a second bar-pattern of backlighting.

8. The autostereoscopic display system of claim 1, further comprising:
a viewer tracking subsystem configured to track a pose of each of the one or more viewers; and
wherein the subset of backlight pixels selected for activation during display of a frame is selected based on a pose of a viewer of the one or more viewers intended to view the display of the frame.

9. The autostereoscopic display system of claim 8, further comprising:
a video subsystem configured to generate the frame for display based on the pose of the viewer intended to view the display of the frame.

10. The autostereoscopic display system of claim 8, wherein the frame comprises a three-dimensional (3D) composite frame comprising a first subset of pixels representing image content for a left eye of a viewer and a second subset of pixels representing image content for a right eye of the viewer.

11. The autostereoscopic display system of claim 1, wherein the selectively-transmissive display pixel matrix comprises a liquid crystal pixel array.

12. A method comprising:
responsive to detecting a first pose of a first viewer, selectively activating a first subset of backlight pixels, corresponding to the first pose, of a backlight of a display panel and transmitting light emitted by the first subset through a first lenticular array disposed directly adjacent to the backlight, a selectively-transmissive display pixel matrix disposed directly adjacent to the first lenticular array, and a second lenticular array disposed directly adjacent to a selectively-transmissive display pixel matrix so that the display panel emits first display light representative of a first frame in a first direction relative to the display panel, wherein a first viewer is positioned in the first direction relative to the display panel; and
responsive to detecting a second pose of a second viewer, selectively activating a second subset of backlight pixels, corresponding to the second pose, of the backlight and transmitting light emitted by the second subset through the first lenticular array, the selectively-transmissive display pixel matrix, and the second lenticular array so that the display panel emits second display light representative of a second frame in a second direction relative to the display panel, wherein a second viewer is positioned in the second direction relative to the display panel.

13. The method of claim 12, further comprising:
tracking the first pose of the first viewer and the second pose of the second viewer;
selecting the first subset of backlight pixels based on the first pose of the first viewer; and
selecting the second subset of backlight pixels based on the second pose of the second viewer.

14. The method of claim 13, further comprising:
generating the first frame based on the first pose of the first viewer; and
generating the second frame based on the second pose of the second viewer.

15. The method of claim 14, wherein each of the first frame and the second frame each comprises a three-dimensional (3D) composite frame comprising a first subset of pixels representing image content for a left eye of at least one of the first viewer or the second viewer and a second subset of pixels representing image content for a right eye of the at least one of the first viewer or the second viewer.

16. The method of claim 12, wherein:
activating the first subset of backlight pixels produces a first bar-pattern of backlighting; and
activating the second subset of backlight pixels produces a second bar-pattern of backlighting.

17. The method of claim 12, wherein the first lenticular array faces the backlight, the second lenticular array faces the first viewer and the second viewer, and the selectively-transmissive display pixel matrix is disposed between the first lenticular array and the second lenticular array.

18. An autostereoscopic display system to perform the method of claim 12.

19. A non-transitory computer readable medium storing executable instructions configured to manipulate at least one processor to perform the method of claim 12.

* * * * *